US008600937B1

(12) United States Patent
Ravan

(10) Patent No.: US 8,600,937 B1
(45) Date of Patent: Dec. 3, 2013

(54) SYSTEM AND METHOD FOR FAST VOLUME CLONING

(75) Inventor: Daniel Ravan, Fremont, CA (US)

(73) Assignee: EMC Corporation, Hopkinton, MA (US)

( * ) Notice: Subject to any disclaimer, the term of this patent is extended or adjusted under 35 U.S.C. 154(b) by 435 days.

(21) Appl. No.: 12/242,390

(22) Filed: Sep. 30, 2008

(51) Int. Cl.
*G06F 7/24* (2006.01)
*G06F 17/30* (2006.01)

(52) U.S. Cl.
USPC ............ 707/637; 707/610; 707/645; 707/638

(58) Field of Classification Search
USPC .......... 707/204, 999.204, 645, 661, 610, 638, 707/639, 655, 999.1, 637
See application file for complete search history.

(56) References Cited

U.S. PATENT DOCUMENTS

| | | | |
|---|---|---|---|
| 5,271,009 A * | 12/1993 | Takano et al. ................. | 370/473 |
| 6,708,233 B1 * | 3/2004 | Fuller et al. ..................... | 710/22 |
| 6,757,746 B2 * | 6/2004 | Boucher et al. ............... | 709/250 |
| 2002/0133491 A1 * | 9/2002 | Sim et al. ........................ | 707/10 |
| 2005/0138090 A1 * | 6/2005 | Augenstein et al. .......... | 707/204 |
| 2008/0256138 A1 * | 10/2008 | Sim-Tang ...................... | 707/202 |
| 2008/0307020 A1 * | 12/2008 | Ko et al. ......................... | 707/204 |
| 2012/0096311 A1 * | 4/2012 | Bodrner et al. ................ | 714/19 |

* cited by examiner

*Primary Examiner* — Bruce Moser
(74) *Attorney, Agent, or Firm* — Dergosits & Noah LLP; Todd A. Noah

(57) ABSTRACT

The invention is a system and method for quickly cloning a backup (file system) volume. Present volume cloning methods are based on creating copies of individual save sets written to a backup volume. However, this requires the steps of reading data blocks to cull the backed up data, stored as data chunks, from the chunk headers that separate and describe each data chunk, then writing the data chunks to new media. As a result, cloning a backup volume is time consuming and tedious. The invention applies the features and benefits of advanced file system devices ("AFTDs") to volume cloning. AFTDs store data as streams, rather than chunks, since AFTDs store data on disk media rather than on tape with tape blocks. As such, data stored on AFTDs are not separated by chunk headers. Instead, an AFTD contains a single volume label file that identifies the AFTD volume. The invention is a system and method for cloning backup volumes stored on AFTDs. Because data on AFTDs does not require separating data chunks from chunk headers, data may be quickly streamed and written from a source AFTD to a destination AFTD. The invention thereby creates a mirror image of the source device more quickly than cloning a tape volume.

13 Claims, 4 Drawing Sheets

SYSTEM AND METHOD FOR FAST VOLUME CLONING

FIELD

The present invention relates generally to backup data replication, and specifically, to cloning backup volumes using a file system device.

BACKGROUND

Backup storage media such as tape or disk are often replicated for retention and security purposes. It is well-known that storage media is subject to corruption, deterioration or loss. Therefore, rather than rely on a single copy of the backed up data, or "volume," on the storage media, another copy of the backup volume is often created and stored in a secure remote location. One process for creating a copy of the original backup volume is called replication or cloning. For example, the original backup volume may be replicated to create a clone of the original "source" backup volume on another "destination" storage media. At present, tapes are the most prevalent media used for storing backup volumes because of their perceived low cost and stability. However, cloning tape backup media is a slow and resource-intensive process due to the way backup data is written to tape. The cloning process is also slow for file system devices that store backup data on disk, but emulate tape backup.

A. Backup to Tape and File System Devices

The backup process typically includes a backup and recovery application ("BURA") server connected over a network to a number of backup clients, such as desktop computers, servers or networked storage devices. One will appreciate that a BURA software application that manages the backup and recovery process may reside on a dedicated BURA server. During the backup process, the BURA software application may create and write one or more databases to the storage media. For example, the BURA may create a volume header file, or "volume label," that describes the data volume written to the storage media. In order to keep track of the backup media itself, the BURA may create and store a media database with information describing the storage media itself, whether it is tape or disk, how the data is organized on the media, and/or whether the storage media is an original source backup volume or a clone. This media database may be stored on the dedicated BURA server.

During the backup process, data will be transmitted from backup clients to the BURA server as save sets. A save set may comprise the file system and file system data from a single backup client. Save sets are temporarily stored in one or more memory buffers in the BURA server before being written to the storage media. Since save sets may be quite large, it may be packaged or segmented into one or more data "chunks" by the BURA. Without this segmentation, a network may be overwhelmed by the amount of data transfer. Transmitting save sets as chunks helps manage network traffic.

Once a save set has been divided into chunks, these chunks are transmitted over the network to the BURA server. Chunks from different save sets may reach the BURA server at different times. In order to keep track of each chunk, the BURA will associate the chunk with information that identifies the chunk's corresponding save set. This information may be written to the BURA's media database. The information may also be written as a "chunk header" that typically precedes its respective chunk on the storage media. As a result, chunks are separated on the storage media by respective chunk headers.

FIG. 1 illustrates how a portion, or "tape block" 101, may appear after backup to tape storage media. As shown in FIG. 1, chunk data from different save sets may be written to the same tape block 101. Block header 105 may contain metadata about all the data in its tape block. Chunk header 111 may describe the physical location, save set information and other information about chunk data 115. Similarly, chunk header 121 may describe the physical location, save set information and other information about chunk data 125. Chunk data 115 and chunk data 125 may originate from different save sets, but they are each separated by their respective chunk header.

Disk media, such as a file system or file type device, is becoming more favorable over tape media. Disk media can store more data and be read faster than tape. Nevertheless, backup to disk media often follows the same save set chunking, buffering and recording steps used during backup to tape. As a result, the backup data on a file system device may resemble or may appear to resemble data backed up to tape. The file system device will contain backup data as blocks organized as chunks that are separated by chunk headers. As will be discussed further below, the problems with cloning file system device backups are similar to the problems with cloning tape backups.

B. Cloning Tape and/or File System Device Volumes

As previously discussed, the purpose of replicating or cloning backup storage media is to create an exact copy of all of the data on the storage media, also known as the "volume." However, cloning a tape storage volume is not a trivial process. Cloning data that is organized by chunks and chunk headers requires reading each chunk header to determine information about its respective chunk, extracting the chunk data, then recording the chunk data with a new chunk header onto the new "destination" backup device. The new chunk header will contain information about the physical location of the chunk on the destination backup device. In addition, the media database on the BURA server that stores information for the destination backup device may require updating. As a result, cloning tape media is tedious, slow, and akin to a complete recovery and write process.

Disk media, particularly file system devices used to store backed up file systems, also suffer from the same problems. Even though a disk does not require data organization by chunks and chunk headers, most backup processes emulate this method because of the legacy software used to manage the backup process. Also, users are familiar with the way data is organized on tapes, and therefore adopt this organization even though it may not be the most efficient use of disk media.

Since the BURA is the only software application designed to manage recovery operations, cloning tapes may divert its resources away from its usual tasks of backing up data. As a further result, since the new backup volume will necessarily have different chunk header information for each respective chunk, the data on the destination backup volume will not be a true clone of the data on the source backup volume. These slight discrepancies increase the propensity of error, which defeats the purpose of the cloning process.

What is therefore needed is an improved way to clone data, particularly backup data volumes.

BRIEF DESCRIPTION OF THE FIGURES

The present invention is illustrated by way of example and not limitation in the figures of the accompanying drawings, in which like references indicate similar elements, and in which.

DETAILED DESCRIPTION

Figure 1:
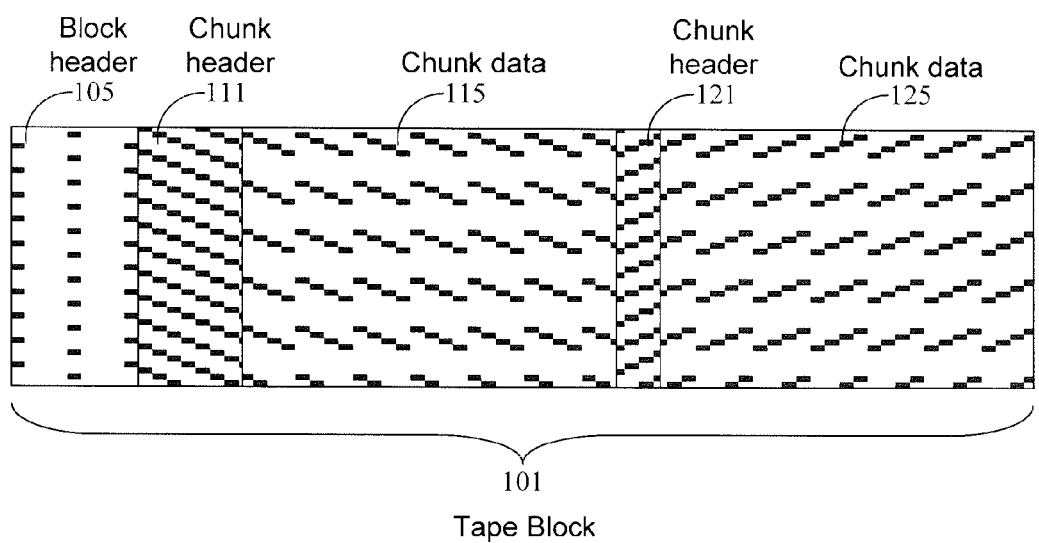
FIG. 1 is an exemplary block diagram of a prior art tape block, according to one embodiment of the present invention.
Figure 2:
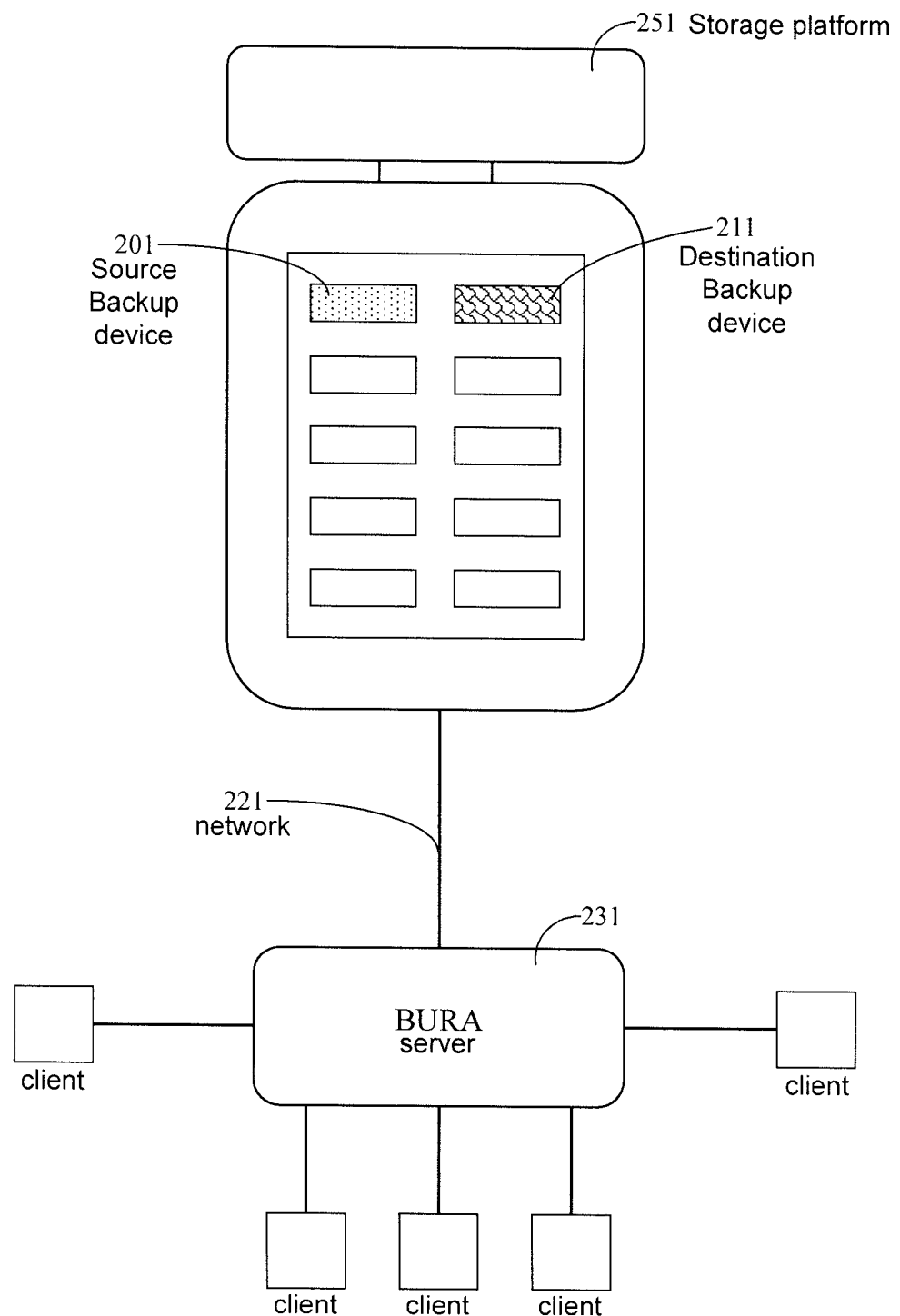
FIG. 2 is an exemplary block diagram depicting one embodiment of the present invention.

The present invention is a system and method for quickly cloning a backed up file system volume stored on a file system device. As illustrated in FIG. 2, an embodiment of the present invention involves a source backup device 201 and a destination backup device 211. Source backup device 201 may already contain a previously backed up file system stored as a file system volume. Source backup device 201 and destination backup device 211 may be directly connected to each other or be contained in a storage array, such as a disk array, tape library, or a combination of the two. As such, source backup device 201 and destination backup device 211 may be managed by a storage platform 251. Two such storage platforms presently on the market include EMC Symmetrix® and EMC Clariion®, which are both manufactured and marketed by the assignee of the present invention.

In an embodiment, source backup device 201 and destination backup device 211 may be connected by a network 221 or other communications link between source backup device 201 and destination backup device 211, thereby forming part of a storage area network. In addition, a BURA server 231 running a BURA software application may be connected to network 221 to manage the backup and/or recovery process. A person having ordinary skill in the art will appreciate that the BURA server may be a software application residing on a server, or may be a type of hardware designed to manage the backup and recovery of data accessible through network 221. Other servers and computers may also have access to network 221.

It should be appreciated that the present invention can be implemented in numerous ways, including as a process, an apparatus, a system, a device, a method, or a computer readable medium such as a computer readable storage medium containing computer readable instructions or computer program code, or a computer network wherein computer readable instructions or computer program code are sent over optical or electronic communication links. Applications may take the form of software executing on a general purpose computer or be hardwired or hard coded in hardware. In this specification, these implementations, or any other form that the invention may take, may be referred to as techniques. In general, the order of the steps of disclosed processes may be altered within the scope of the invention.

In an embodiment, source backup device 201 and destination backup device 211 are "file system devices" or "file type devices" that each store data on disk. One having skill in the art will appreciate that file system devices are not limited to storing backed up file system data; however, in this embodiment, source backup device 211 may contain a backed up file system or backup volume from a previous backup operation. This data may be stored in the same format as it was streamed and written, known as "save stream format." The ability to receive and store data in save stream format may identify source backup device 201 and destination backup device 211 as advanced file system devices, or "AFTDs," which organize stored data differently than a tape storage device or a file system device that emulates a tape storage device.

A. Cloning an Advanced File System Device

As previously discussed, cloning a backup volume stored on tape media requires identifying all of the chunks associated with each save set, which further involves reading the media database to locate the proper source volume, reading the source volume label, then reading each chunk's header information on the source storage media. These steps are similar to data recovery, in which chunk headers have to be read to determine what chunk it describes, what save set the chunk is associated with, and what the chunk's relationship is to the other chunks from the save set. During a replication or cloning operation, the chunk may then be copied to the new media, and a new chunk header will need to be created and written to reflect the chunk's new location. Because of this lengthy "recovery and writing" process, cloning tape media often requires the same time, resources and steps as a full backup process. In addition, because of the recovery steps involved, the BURA may have to perform these steps, thereby diverting it from its normal backup responsibilities.

Backing up to AFTDs and cloning backup data stored on AFTDs will overcome the issues associated with cloning tape backup and emulated tape backup. Instead of relying on previous methods of organizing storage data into chunks with chunk headers, the present invention is a method for using backup data that is organized without chunk headers, such as data stored on AFTDs. Presently, AFTDs are used as short-term storage devices or for simply storing file systems, and are not generally considered as a backup storage device. However, the present invention extends the use of AFTDs in order to provide for faster volume cloning.

Figure 3:
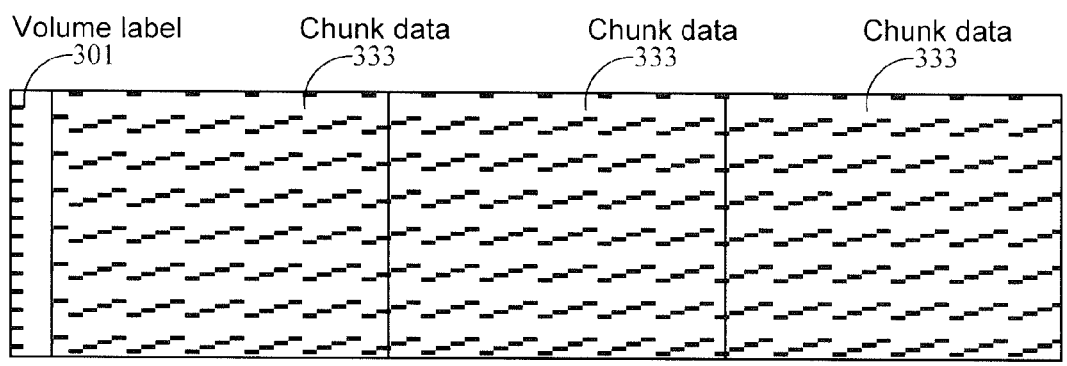
FIG. 3 is an exemplary block diagram of an advanced file system device, according to one embodiment of the present invention.

Writing backup data to an AFTD may still require that save sets be transmitted as chunks; however, instead of buffering chunks and creating chunk headers, these chunks may be streamed to the storage media without chunk headers. This is because AFTDs do not require organizing chunks into tape blocks, but can receive direct streams of data chunks. As a result, chunks written to the AFTD retain their save stream format. Thus, as illustrated in FIG. 3, the AFTD may contain backup data stored as chunks 333 not separated by chunk headers. Instead, there may be a volume label 301 containing metadata that identifies the volume stored in the AFTD. Even though FIG. 3 shows volume label 301 preceding chunks 333, one will appreciate that on AFTDs, volume label 301 does not have to physically precede any associated chunks. It can reside anywhere on the storage media, and may be rewritten and updated with new information on the data backed up on the storage media.

Because AFTDs lack chunk headers, cloning an AFTD will not be slowed by the step of reading chunk headers before extracting chunk data. Additionally, recording new chunk header data will not be necessary if cloning to another AFTD. The present invention therefore offers an improvement over the prior art method of cloning from tape devices or other storage media that organize using chunk headers.

Figure 4:
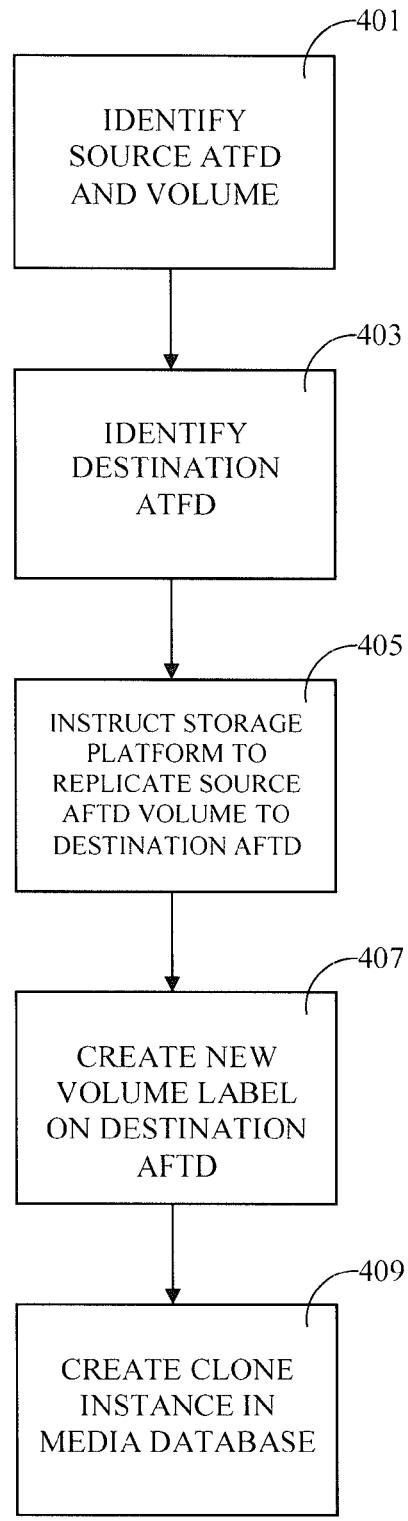
FIG. 4 is an exemplary flow diagram illustrating the steps of an embodiment of the present invention.

Cloning an AFTD may be performed by the storage platform 251 rather than a BURA or BURA server, thereby allowing the BURA to focus on backup operations without being diverted to cloning operations. The storage platform 251 may need to be configured to implement the method illustrated in FIG. 4. The storage platform 251 may already understand the command to replicate one storage device to another, but added modifications may be necessary in order to ensure that the replicated storage device is properly identified as a clone. One will appreciate that the steps illustrated in FIG. 4 are merely exemplary, and may be performed in a different order without departing from this disclosure or the scope of the invention.

In step 401, the AFTD source backup device 201 and the backup data, or volume on source backup device 201 should be identified. This may require identifying the physical location of the AFTD source backup device 201 or referring to an identifier for the AFTD source backup device 201. One will appreciate that AFTD source backup device 201 should already contain a backup volume. In step 403, the AFTD destination backup device 211 should be identified. This may require identifying AFTD destination backup device 211's physical location, or referring to an identifier for the AFTD destination backup device 211. This may also require that the BURA configure the AFTD to store backup data instead of other types of data.

In step 405, storage platform 251 may be instructed to copy, clone or replicate source backup device 201. Data from AFTD source backup device 201 may then be streamed, transmitted or otherwise replicated to AFTD destination backup device 211. This step will create an exact copy of the source backup device 201 as destination backup device 211. In step 407, a new volume label file may be created on destination backup device 211 to identify that the volume on device 211 is a cloned volume of source backup device 201. This may require overwriting, updating, editing or otherwise altering the volume label file copied from source backup device 201 to destination backup device 211. As a result, only the volume label for the cloned volume will differ from the source volume label that may have originally been written by the BURA. The data on AFTD destination backup device 211 will be a more exact clone of source backup device 201 than the clone of a tape or file system device.

In step 409, the media database stored on the BURA server should be modified to identify that the volume stored on destination backup device 211 is a clone of the volume stored on source backup device 201, also known as "creating a clone instance in the media database." In this fashion, the BURA will understand that AFTD destination backup device 211 is a clone of AFTD source backup device 201. Editing the media database may be a function of the BURA or storage platform 251. As a result of the method shown in FIG. 4, the clone instance of the source backup device 201 volume will resemble volume label 301 and chunks 333 in FIG. 3; however, volume label 301 for the clone instance on destination backup device 211 will differ from volume label 301 on source backup device 201.

In an embodiment, storage platform 251 will recognize instructions for the cloning process. The process may be initiated by a single command line instruction, or may be manually instructed by a series of instructions from a backup client computer, networked server, the BURA, the storage platform 251, an administrator or the like. In an embodiment, replication may be automated by storage platform 251, but the steps of overwriting the volume label in the destination backup device 211 and/or creating a clone instance in the media database may be manually performed or performed by the BURA. In an embodiment, only portions of the source backup volume may be cloned. For example, if only certain data stored on the AFTD is selected for long-term storage on a secondary device, or if selected data from multiple AFTDs is to be combined and cloned to a single AFTD, the present invention may also apply. One will appreciate that the system and method of using storage platform 251 to manage cloning operations between AFTDs is open to many variations without departing from the scope of this disclosure.

The present invention therefore improves upon existing methods by offloading cloning operations from the BURA server to the storage platform. Additionally, the present invention offers a significantly faster cloning method than that currently used by tape and disk media. As a result, cloning operations may be performed more frequently, thereby preventing disaster from reliance on a single backup.

One will appreciate that in the description above and throughout, numerous specific details are set forth in order to provide a thorough understanding of the present invention. It will be evident, however, to one of ordinary skill in the art, that the present invention may be practiced without these specific details. In other instances, well-known structures and devices are shown in block diagram form to facilitate explanation. For example, the present invention is discussed in the context of cloning backup media. One will appreciate that other data may be cloned using the present invention as well. The description of the preferred embodiments is not intended to limit the scope of the claims appended hereto.

What is claimed is:

1. A method for cloning a backup volume stored on a source advanced file system device to a destination advanced file system device, the source and destination advanced file system devices being managed by a storage platform, the method comprising:

copying, by the storage platform, backup data and a volume label from the source advanced file system device to the destination advanced file system device to create an exact copy of the backup data stored on the source advanced file system device on the destination advanced file system device, wherein the backup data saved on the source advanced file system device is from a previous backup operation performed by a backup and recovery application (BURA) server and is stored in save stream format in chunks without chunk headers and further wherein the volume label on the source advanced file system device was created by the BURA server and contains metadata that identifies the backup volume stored on the source advanced file system device;

creating an updated volume label on the destination advanced file system device that identifies the copied backup volume on the destination advanced file system device as a cloned volume of the backup data stored on the source advanced file system device, wherein the updated volume label for the copied backup volume is different from the volume label written by the BURA server; and modifying a media database stored on the BURA server to identify that the backup volume stored on the destination advanced file system device is a clone of the backup volume stored on the source advanced file system device.

2. The method of claim 1, wherein the source advanced file system device and the destination advanced file system device receive and store data in save stream format.

3. The method of claim 2, wherein the source advanced file system device and the destination advanced file system device are file system devices each having disk storage media.

4. The method of claim 1, wherein creating the updated volume label comprises overwriting, editing or altering the copied volume label.

5. The method of claim 1, wherein
the media database comprises a first entry identifying that the backup volume stored on the source advanced file system device is a first backup of data stored on a plurality of client devices coupled to the server, the method further comprising:
after the copying the backup data from the source advanced file system device to the destination advanced file system device, modifying the media database so that the modified media database comprises a second entry indicating that the backup volume stored on the destination advanced file system device is a second backup, the second backup being the same as the first backup, thereby permitting the data stored on the plurality of client devices to be restored using the first backup or the second backup.

6. The method of claim 1 wherein each chunk stored on the source advanced file system device is not preceded by a header.

7. The method of claim 1 wherein each chunk of the backup data copied from the source advanced file system device to the destination advanced file system device is not preceded by a header.

8. The method of claim 1 wherein each chunk stored on the source advanced file system device is not preceded by a header, and each chunk of the backup data copied from the source advanced file system device and stored on the destination advanced file system device is not preceded by a header.

9. A non-transitory computer readable medium containing computer readable instructions for cloning a backup volume stored on a source advanced file system device to a destination advanced file system device, the source and destination advanced file system devices being managed by a storage platform, the computer readable instructions comprising:
   computer program code for copying backup data and a volume label from a source advanced file system device to the destination advanced file system device to create an exact copy of the backup data stored on the source advanced file system device on the destination advanced file system device, wherein the backup data saved on the source advanced file system device is from a previous backup operation performed by a backup and recovery application (BURA) server and is stored in save stream format in chunks without chunk headers and further wherein the volume label on the source advanced file system device was created by the BURA server and contains metadata that identifies the backup volume stored on the source advanced file system device;
   computer program code for creating an updated volume label on the destination advanced file system device that identifies the copied backup volume on the destination advanced file system device as a cloned volume of the backup data stored on the source advanced file system device, wherein the updated volume label for the copied backup volume is different from the volume label written by the BURA server; and
   computer program code for modifying a media database stored on the BURA server to identify that the backup volume stored on the destination advanced file system device is a clone of the backup volume stored on the source advanced file system device.

10. The non-transitory computer readable medium containing computer readable instructions of claim 9, wherein the source advanced file system device and the destination advanced file system device receive and store data in save stream format.

11. The non-transitory computer readable medium containing computer readable instructions of claim 9, wherein computer program code for creating the updated volume label comprises further computer program code for overwriting, editing or altering the copied volume label.

12. A system for cloning a backup volume stored on a first advanced file system device to a second advanced file system device, the first and second advanced file system devices being managed by a storage platform, the system comprising:
   the first advanced file system device having a backup volume stored thereon with a volume label, wherein backup data stored on the first advanced file system device is from a previous backup operation performed by a backup and recovery application (BURA) server and is stored in save stream format in chunks without chunk headers and further wherein the volume label on the first advanced file system device was created by the BURA server and contains metadata that identifies the backup volume stored on the first advanced file system device;
   the second advanced file system device; and
   the storage platform configured for copying the volume label and backup data from the first advanced file system device to the second advanced file system device to create an exact copy of the backup data stored on the first advanced file system device on the second advanced file system device and for creating an updated volume label on the second advanced file system device that identifies the copied backup volume on the second advanced file system device as a cloned volume of the backup data stored on the first advanced file system device, wherein the updated volume label of the copied backup volume device is different from the volume label written by the BURA server and for modifying a media database stored on the BURA server to identify that the backup volume stored on the second advanced file system device is a clone of the backup volume stored on the first advanced file system device.

13. The system of claim 12, wherein the first advanced file system device and the second advanced file system device receive and store data in save stream format.

\* \* \* \* \*